United States Patent [19]

Rohee

[11] Patent Number: 5,779,313
[45] Date of Patent: Jul. 14, 1998

[54] ARTICULATION FOR A VEHICLE SEAT

[75] Inventor: René Rohee, La Chapelle-Biche, France

[73] Assignee: Bertrand Faure Equipements SA., Boulogne, France

[21] Appl. No.: 740,055

[22] Filed: Oct. 24, 1996

[30] Foreign Application Priority Data

Oct. 27, 1995 [FR] France ................... 95 12723

[51] Int. Cl.$^6$ ........................................... B60N 2/02
[52] U.S. Cl. ................... 297/367; 297/366; 297/378.12
[58] Field of Search ........................ 297/367, 366, 297/373, 376, 378.12; 74/527

[56] References Cited

U.S. PATENT DOCUMENTS

| | | | |
|---|---|---|---|
| 3,879,802 | 4/1975 | Werner | 297/367 X |
| 4,384,743 | 5/1983 | Barley | |
| 4,770,464 | 9/1988 | Pipon et al. | 297/367 |
| 4,997,223 | 3/1991 | Croft | 297/367 |
| 5,161,856 | 11/1992 | Nishino | 297/367 |
| 5,216,936 | 6/1993 | Baloche | 297/367 X |
| 5,611,599 | 3/1997 | Baloche et al. | 297/367 |

FOREIGN PATENT DOCUMENTS

| | | |
|---|---|---|
| 2.231.538 | 12/1974 | France . |
| 2 578 602 | 9/1986 | France . |
| 2 673 519 | 2/1992 | France . |

*Primary Examiner*—Laurie K. Cranmer
*Attorney, Agent, or Firm*—Larson & Taylor

[57] ABSTRACT

An articulation for a vehicle seat backrest, comprising a closed box formed of a seat part cheek and of a backrest cheek with internal toothing, the box containing followers which are toothed externally and can be shifted radially under the control of a rotary cam. Each follower comprises a first peg capable of interacting with a track of the backrest cheek in order to hold the follower in the unlocked position and a second peg capable of interacting with an opening of a plate connected to the cam in order positively to control the unlocking of the follower.

5 Claims, 2 Drawing Sheets

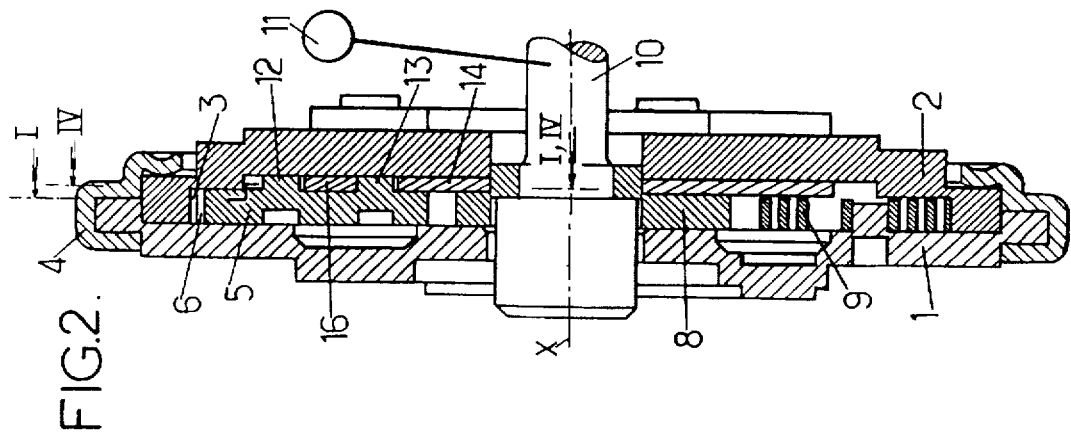
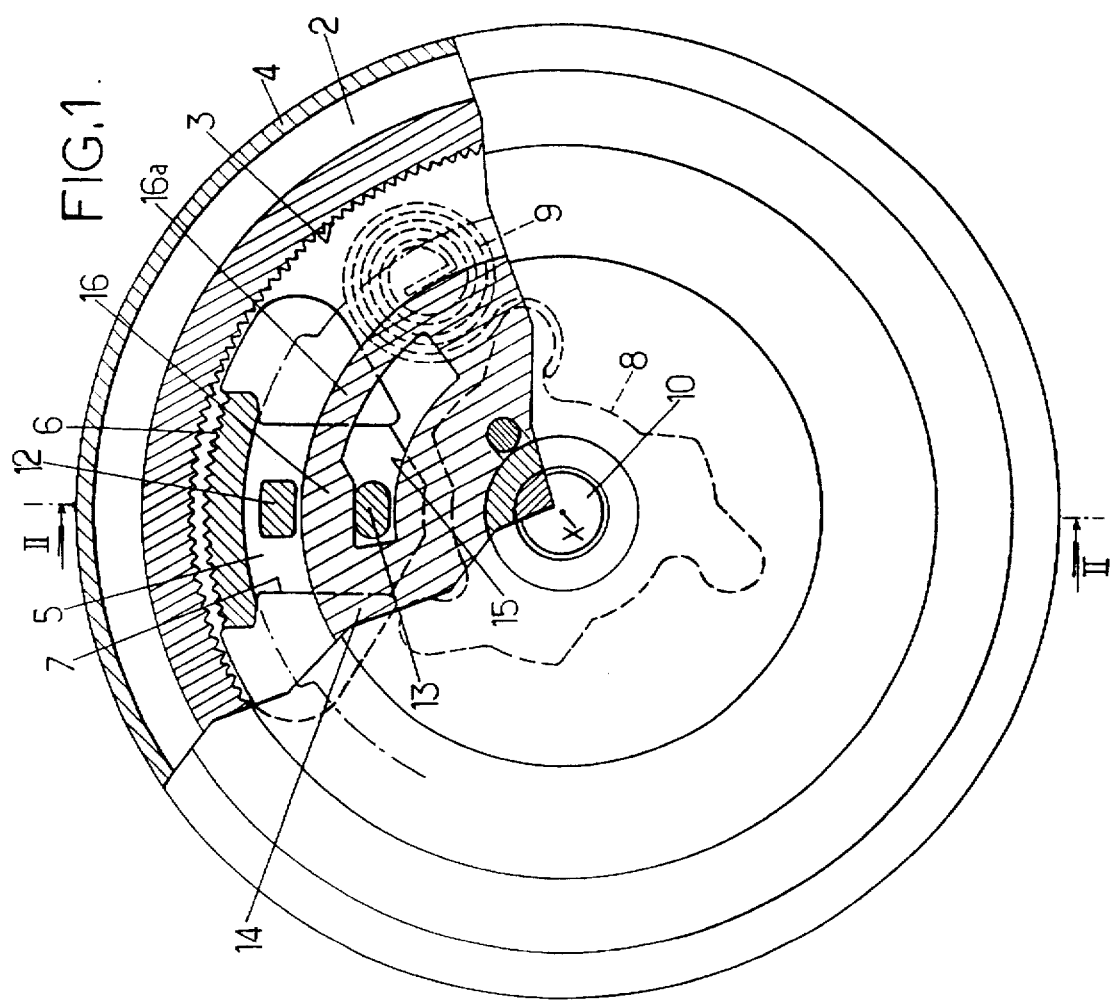

5,779,313

ARTICULATION FOR A VEHICLE SEAT

FIELD OF THE INVENTION

The present invention relates to articulations for vehicle, especially automobile, seats, these articulations allowing the inclination of the backrest of the seat to be adjusted with respect to its seat part about a horizontal axis X.

BACKGROUND OF THE INVENTION

It is aimed more particularly, among these articulations, at those which include:

- a first cheek and a second cheek which are intended to be secured respectively to the seat part of the seat and to the backrest of the seat and which are mounted so that they can pivot one with respect to the other about the axis X so as to form a closed box, the second cheek being secured to toothing which extends over at least a circular arc centered on the axis X and which toothing points radially inward,
- at least one follower inside the box and provided with external toothing capable of interacting with the toothing of the second cheek, this follower being guided as it slides in a radial direction by a guide secured to the first cheek, between a locked position in which the follower interacts with the toothing of the second cheek, thereby blocking the articulation, and an unlocked position in which it is disengaged from the toothing of the second cheek,
- a cam inside the box and mounted so that it can rotate about the axis X in order to control the radial sliding of the follower, this cam being urged by elastic means toward an angular position of rest for which it pushes the follower back into its locked position,
- and a control member accessible to the person sitting in the seat in order to shift the cam from its position of rest into a working position in which it allows the follower to slide into its disengaged position.

The invention is aimed more particularly still, among said articulations, at those which comprise:

- on the one hand, a peg projecting axially from each follower,
- and, on the other hand, a stepped circular ramp connected to the cheek of the backrest and capable of interacting with the pegs so as positively to hold the followers in their disengaged positions for predetermined ranges of angular positions of the backrest.

Such a construction makes it possible to hold the articulation in its unlocked position even after having let go of the member for controlling unlocking, for certain manipulations of the backrest such as temporarily folding it forward against the seat part with a view to gaining unimpeded access to the rear seats of the vehicle.

Such articulations have been disclosed in the document FR-B-2 673 519.

In the embodiments which have been described in this document, each follower is made to slide into its disengaged position by a small spring leaf resting both against this follower and against its housing.

The presence of these not very powerful elastic components may weaken the articulation.

What is more, if at least one of said components becomes shifted or excessively weakened owing, for example, to aging, the toothing associated therewith and belonging to the follower may come back into, or remain in, mesh with the toothing opposite it belonging to the cheek of the backrest, there then being the risk of creating problems.

OBJECT AND BRIEF SUMMARY OF THE INVENTION

The object of the invention, among other things, is to eliminate this drawback and to this end to propose extremely simple means for positively controlling the disengagements of the toothed followers when the cam is placed in its unlocked angular positions.

To this end, the articulations of the sort in question according to the invention are essentially characterized in that they comprise, on the one hand, a second peg projecting axially from each follower and, on the other hand, a thin plate secured to the cam and cut with openings each capable of interacting with one of said second pegs so as positively to control its shifting toward the axis X and hold it in a disengaged position for those positions of the cam which correspond to the articulation being unlocked, said plate comprising, between the two pegs of each follower, a bowed bridging piece with a portion which is thin enough to make the radial excursions of the followers possible.

In preferred embodiments, recourse is further had to one and/or other of the following provisions:

- the two pegs of each follower are formed by part stamping this follower,
- the respective axial projections of the two pegs on each follower are mutually identical,
- the axial projections of the pegs on each follower have a thickness equal to the thickness of the plate as well as to that of the ramp,
- the ramp forms an integral part of the backrest cheek, having been formed by stamping with this cheek.

Aside from these main provisions, the invention comprises certain other provisions which are preferably employed at the same time and which will be dealt with more fully hereinbelow.

BRIEF DESCRIPTION OF THE DRAWINGS

In that which follows, a preferred embodiment of the invention is going to be described with reference to the drawings which are appended hereto in a way which is, of course, nonlimiting.

FIGS. 1 and 2 of these drawings show respectively in a view from the side, a portion cross sectioned on I—I of FIG. 2, and, in cross section on II—II of FIG. 1, a motor vehicle seat articulation constructed according to the invention, for its unlocked position allowing the inclination of the backrest to be adjusted.

MORE DETAILED DESCRIPTION

Figure 3:
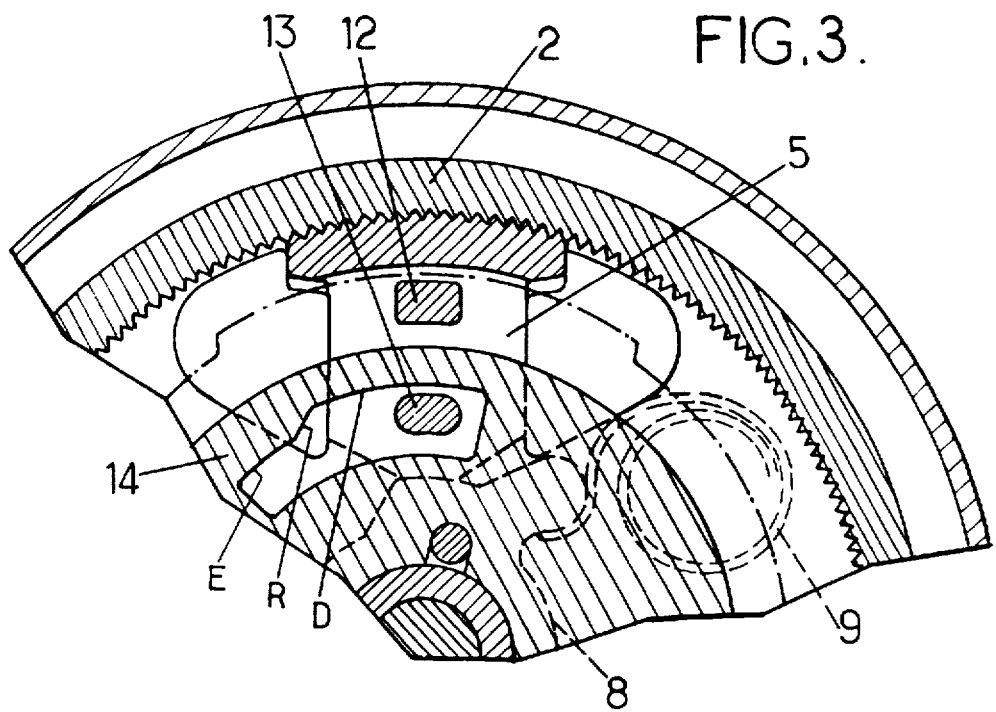
FIG. 3 shows, in a similar way to FIG. 1, the sectioned portion of this FIG. 1 for the articulation in the locked condition.

In a way that is, in itself, known, the articulation comprises:

- a first cheek 1 called the stationary cheek, which can be secured to the armature of the seat part of the seat,
- a second cheek 2 known as the mobile cheek, which can be secured to the armature of the backrest of the seat and which pivots about the horizontal axis of rotation X of this backrest, the stationary cheek and mobile cheek together forming a round box, and the mobile cheek including circular toothing 3 pointing radially inward and arranged inside the box, a ring of sheet metal 4 which is crimped over the perimeter of the stationary cheek 1 and which partially covers the mobile cheek 2 in order to close the box and hold the perimeters of the two cheeks one against the other, three metal followers 5 each provided with external toothing 6 capable of interacting with the internal toothing 3 of the mobile cheek, these three followers being guided as they slide radially in guide slots 7 formed in the stationary cheek, the directions of sliding of the three followers being offset from each other by 120 degrees about the axis X, a cam 8, which can rotate about the axis X and acts on the three followers 5, it being possible for this cam to be shifted through an angle between, on the one hand, a position of rest in which it pushes the followers back into a locked position for which the external toothings 6 of the followers interact with the internal toothing 3 of the mobile cheek, thus blocking said mobile cheek and, on the other hand, a working or unlocked position for which said cam allows the followers 5 to move back into a nonobstructing position for which their external toothings are disengaged from the internal toothing of the mobile cheek, three springs 9, here consisting of spiral-wound strips, which angularly urge the cam 8 into its angular position of rest corresponding to the locking of the articulation (only one of the springs has been represented in FIG. 1, for reasons of simplification), and a shaft 10 of axis X secured to the cam 8 and connected to a control member such as a lever handle accessible to the person sitting in the seat and represented very diagrammatically as 11 in FIG. 2.

Figure 4:
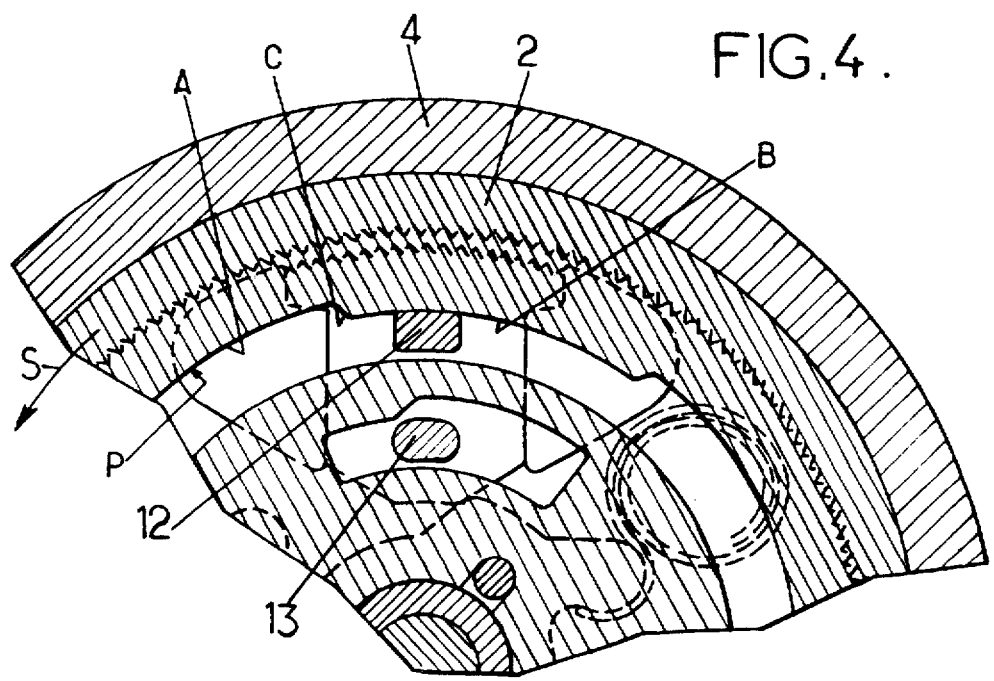
FIG. 4 shows another portion of said articulation, cross sectioned on IV—IV of FIG. 2, for its condition locked in the unlocked position when the backrest is folded down toward the front of the seat.

Furthermore, provided on each follower 5 is a peg 12 projecting from this follower in the direction of the axis X, and the mobile cheek 2 is secured fast to a stepped track P surrounding the pegs 12 (see FIG. 4).

This track P comprises circular arcs A and B of different diameters centered on the axis X and joined together by portions C.

The diameters of the arcs A and B are determined in such a way:

that, when a portion A of larger diameter comes opposite a peg 12 the latter, and therefore the corresponding follower 5, can describe its full radial travel (see FIGS. 1 and 3), and that, by contrast, when a portion B of smaller diameter comes opposite such a peg 12, after the track P has been shifted through a large enough angle about the axis X in the direction of the arrow S, said peg 12 is radially blocked by said portion B in its disengaged position closest to the axis X corresponding to the unlocking of the articulation (see FIG. 2).

This measure allows the followers 5 to be held in their disengaged unlocked positions even if the user lets go of the lever handle 11 while the backrest is in an inclined position such that a portion of a circular arc B of the track P is radially opposite each of the pegs 12.

The backrest angular positions in question are those for which it is desired for the articulation to remain unlocked and correspond for example to the backrest being folded forward with a view to making access to the rear seats of the vehicle easier, as is common for vehicles having just two side doors.

The radial blocking of the followers 5 created by the interaction of the portions B of the track P with the pegs 12, is, of course, automatically eliminated as soon as the portions of the arcs A replace the previous ones in their positions radially opposite the pegs 12: this is because the pegs 12 can then describe their full radial travel, which allows the followers 5 again to lock the backrest angularly.

Furthermore, in accordance with the invention, provided on each follower 5 is a second peg 13 projecting from this peg in the direction of the axis X, and the cam 8 is secured fast to a thin plate 14 cut with openings 15 through each of which one of the second pegs 13 passes.

Each opening 15 is circumferentially elongate about the axis X and its edge furthest from this axis has a step in the sense that it comprises two circular arcs D and E of different diameters joined together by an oblique ramp R.

The diameters of the arcs D and E are determined in such a way:

that, when the arc D of larger diameter comes radially to face the corresponding peg 13, the latter is free to describe all of its radial travel (see FIG. 3), and that, by contrast, when the arc E of smaller diameter comes to face the peg, this arc is then pressed radially against this peg and holds it in its position closest to the axis corresponding to the unlocking of the articulation (see FIG. 1).

Thanks to the obliqueness of the ramp R, simply rotating the plate 14 allows, through the peg 12 sliding against this ramp, this peg to be shifted positively into its disengaged unlocked position.

Of course, for full radial excursion of each follower to be possible, the holed plate 14 needs to comprise, between the two pegs 12 and 13 of each follower, a bowed bridging piece 16 having a narrow enough portion 16a.

It should be noted that the holed plate is housed inside the closed box delimited by the cheeks 1 and 2 in company with all of the following elements: internal toothing 3 of the mobile cheek 2, followers 5 and their toothings 6, guides 7, cam 8, springs 9 and track P and that all these components are automatically juxtaposed therein without play, with a small amount of slippage, in the smallest possible space, as a result simply of crimping the ring of sheet metal 4 over the juxtaposed peripheral annular bearing surfaces of the two cheeks 1 and 2.

In definitive terms, the articulation operates as follows.

At rest (FIG. 3), the cam 8 is in its angular position for which the followers 5 are in their radial position furthest from the axis X with their toothings 6 in mesh with the toothing 3 of the mobile cheek 2: the backrest is therefore immobilized.

In order to alter the angular position of this backrest, the user of the seat actuates the lever handle 11 against the return forces of the springs 9, and this has the following two consequences:

the radially projecting portions of the cam 8 which were pressed against the followers 5 for bringing them into engagement with the toothed ring 6 are shifted angularly, allowing the followers to be shifted radially toward the axis X, these shifting movements are imposed by the interaction of the openings 15 in the plate 14 with the pegs 13.

In other words, we see a "positive" control over the radial disengagement of the toothing 6 of each follower 5 from the toothing 3 of the mobile cheek 2.

The backrest is therefore free to rotate about the axis X with respect to the seat part.

The user of the seat can then alter the angular inclination of this backrest, especially by pressing his or her back against it to a greater or lesser extent against the action of an appropriate return spring and, when the new desired angular position is obtained, all he or she needs to do is let go of the handle 11: the elastic return of the springs 9 then has the effect of returning the assembly formed by the cam 8 and by the plate 14 secured to it to its initial angular position corresponding to locking, for which position, on the one hand, the projecting portions of the cam 8 are again pressed radially against the followers 5 and for which, on the other hand, it is the radially widened portions of the openings 15 which lie over the pegs 13, thus allowing the followers to return to their radial positions furthest from the axis.

The positive control described hereinabove is more reliable than that obtained with embodiments of the prior art using small springs individually urging the followers into their central positions, and the construction proposed for obtaining this result is simplified owing to the fact that it makes it possible to dispense with the small springs in question.

In the preferred embodiment illustrated, each of the two pegs 12 and 13 of each follower 5 is obtained by the part-stamping of said follower and the two pegs project from said follower by identical amounts.

What is more, the thickness of the plate 14, which is equal to the height of each of the two pegs 12 and 13, is relatively small, particularly being of the order of a millimeter.

Finally, the track P on the outside delimits an annular cavity made, also by part-stamping, in the backrest cheek 2, which cavity has a depth, measured in the direction of the axis X, which is also equal to the thickness of the plate 14.

The upshot of this is that, irrespective of the embodiment adopted, a vehicle seat articulation the construction and operation of which are sufficiently evident from the foregoing becomes available.

This articulation displays a certain number of advantages over those known before, and in particular displays the advantage of a particularly compact and robust construction, all of the mechanism with the exception of the control member consisting of a play-free axial stack of flat components contained inside a closed box, as well as the advantage of extremely reliable operation given that it makes it possible:

- not only automatically to hold the toothed followers in their unlocked position, even when the control lever handle is let go, for the angular positions of the backrest for which locking would be undesirable.
- but also positively to control the radial disengagements of the toothed followers from the toothing of the mobile cheek, upon unlock controls.

I claim:

1. An articulation for a vehicle seat, allowing the inclination of the backrest of the seat to be adjusted with respect to its seat part about a horizontal axis of pivoting, including:

a first cheek and a second cheek which are intended to be secured respectively to the seat part of the seat and to the backrest of the seat and which are mounted so that they can pivot one with respect to the other about the axis of pivoting the second cheek being secured to toothing which extends over at least one circular arc centered on the axis of pivoting and which toothing points radially inward, at least one follower inside the box and provided with external toothing capable of interacting with the toothing of the second cheek, this follower being guided as it slides in a radial direction by a guide secured to the first cheek, between a locked position in which the follower interacts with the toothing of the second cheek, thereby blocking the articulation, and an unlocked position in which it is disengaged from the toothing of the second cheek, a cam inside the box and mounted so that it can, rotate about the axis of pivoting in order to control the radial sliding of the follower, this cam being urged by elastic means toward an angular position of rest for which it pushes the follower back into its locked position, and a control member accessible to the person sitting in the seat in order to shift the cam from its position of rest into a working position in which it allows the follower to slide into its disengaged position, the articulation further including, a peg projecting axially from each follower and, a stepped circular ramp connected to the cheek of the backrest and capable of interacting with the pegs so as positively to hold the followers in their disengaged positions for predetermined ranges of angular positions of the backrest, said articulation comprising, a second peg projecting axially from each follower and, a thin plate secured to the cam and cut with openings each capable of interacting with one of said second pegs so as positively to control its shifting toward the axis of pivoting and hold it in a disengaged position for those positions of the cam which correspond to the articulation being unlocked, said plate comprising, between the two pegs of each follower, a bowed bridging piece with a portion which is thin enough to make the radial excursions of the followers possible.

2. The articulation as claimed in claim 1, wherein the two pegs of each follower are formed by stamping this follower.

3. The articulation as claimed in claim 2, wherein the respective axial projections of the two pegs on each follower are mutually identical.

4. The articulation as claimed in claim 3, wherein the axial projections of the pegs on each follower have a thickness equal to the thickness of the plate as well as to that of the ramp.

5. The articulation as claimed in claim 1, wherein the ramp is integrally formed with the backrest cheek.

\* \* \* \* \*